(12) United States Patent
Mujtaba

(10) Patent No.: US 7,991,079 B2
(45) Date of Patent: Aug. 2, 2011

(54) FFT NUMEROLOGY FOR AN OFDM TRANSMISSION SYSTEM

(75) Inventor: Syed Mujtaba, Watchung, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 12/915,107

(22) Filed: Oct. 29, 2010

(65) Prior Publication Data

US 2011/0044160 A1    Feb. 24, 2011

Related U.S. Application Data

(62) Division of application No. 11/838,989, filed on Aug. 15, 2007, now Pat. No. 7,881,398.

(60) Provisional application No. 60/838,990, filed on Aug. 21, 2006.

(51) Int. Cl.
*H03K 9/00* (2006.01)
*H04L 27/00* (2006.01)

(52) U.S. Cl. ........................... 375/316; 370/310

(58) Field of Classification Search .................. 375/316, 375/324, 340; 370/203, 210
See application file for complete search history.

(56) References Cited

U.S. PATENT DOCUMENTS

| | | | |
|---|---|---|---|
| 6,226,337 B1 * | 5/2001 | Klank et al. | 375/367 |
| 6,252,908 B1 | 6/2001 | Tore | |
| 6,459,679 B1 * | 10/2002 | Kim | 370/208 |
| 6,549,572 B1 * | 4/2003 | Anderson et al. | 375/225 |
| 7,072,411 B1 * | 7/2006 | Dollard | 375/260 |
| 7,133,463 B1 | 11/2006 | Amirkhany et al. | |
| 7,346,114 B2 * | 3/2008 | Iancu et al. | 375/260 |
| 7,471,730 B2 | 12/2008 | Adachi | |
| 7,573,944 B2 * | 8/2009 | Chang et al. | 375/260 |
| 2004/0172435 A1 * | 9/2004 | Goel | 708/404 |
| 2005/0237954 A1 | 10/2005 | Hasegawa et al. | |
| 2005/0243938 A1 | 11/2005 | Armstrong et al. | |
| 2006/0109920 A1 | 5/2006 | Sato | |
| 2006/0146944 A1 | 7/2006 | Chiu | |
| 2008/0043708 A1 | 2/2008 | Muharemovic et al. | |

OTHER PUBLICATIONS

Ex parte Quayle dated Aug. 24, 2010 in U.S. Appl. No. 11/838,989.
Ex parte Quayle dated Jun. 23, 2010 in U.S. Appl. No. 11/838,989.

* cited by examiner

*Primary Examiner* — Jean B Corrielus
(74) *Attorney, Agent, or Firm* — Mendelsohn, Drucker & Associates, P.C.; Steve Mendelsohn

(57) ABSTRACT

An exemplary fast Fourier transform (FFT) numerology for an orthogonal frequency division multiple access (OFDMA) downlink transmission system is described. The exemplary FFT numerology reduces the FFT sampling rate for a given transmission bandwidth, thereby increasing the battery life of a UE. The FFT numerology increases robustness against Doppler spread, phase noise, and frequency offset, enabling operation in channels with high delay spread, such as occurs in mountainous regions. The described numerology might provide the following without altering standard sub-frame duration: increased intercarrier spacing; reduced FFT sampling frequency across the transmission bandwidths; reduced FFT size across all transmission bandwidths; increased number of OFDM symbols per sub-frame; and/or increased cyclic prefix length choices.

17 Claims, 4 Drawing Sheets

FIG. 1 (Prior Art)

| Transmission BW | 1.25 MHz | 2.5 MHz | 5 MHz | 10 MHz | 15 MHz | 20 MHz |
|---|---|---|---|---|---|---|
| Sub-frame Duration | 0.5 ms | | | | | |
| Sub-carrier Spacing | 15 kHz | | | | | |
| $T_{useful}$ | 66.67 μs | | | | | |
| Sampling Frequency | 1.92 MHz (1/2x3.84 MHz) | 3.84 MHz | 7.68 MHz (2x3.84 MHz) | 15.36 MHz (4x3.84 MHz) | 23.04 MHz (6x3.84 MHz) | 30.72 MHz (8x3.84 MHz) |
| Sampling Interval | 520.8 ns | 260.42 ns | 130.21 ns | 65.1 ns | 43.4 ns | 32.55 ns |
| FFT Size | 128 | 256 | 512 | 1024 | 1536 | 2048 |
| Number of Occupied Sub-carriers | 76 | 151 | 301 | 601 | 901 | 1201 |
| Occupied RF BW | 1.140 MHz | 2.265 MHz | 4.515 MHz | 9.015 MHz | 13.515 MHz | 18.015 MHz |
| Oversampling Ratio | 1.68 x | 1.70 x | 1.70 x | 1.70 x | 1.70 x | 1.70 x |
| Power Efficiency | 59.3% | 59.0% | 58.8% | 58.7% | 58.7% | 58.6% |
| Number of OFDM Symbols per Frame (Short/Long CP) | 7/6 | | | | | |
| CP Length (μs/samples) Short | (4.69/9)x6, (5.21/10)x1 | (4.69/18)x6, (5.21/20)x1 | (4.69/36)x6, (5.21/40)x1 | (4.69/72)x6, (5.21/80)x1 | (4.69/108)x6, (5.21/120)x1 | (4.69/144)x6, (5.21/160)x1 |
| Spectral Efficiency | 93.33% | 93.33% | 93.33% | 93.33% | 93.33% | 93.33% |
| Long | (16.67/32) | (16.67/64) | (16.67/128) | (16.67/256) | (16.67/384) | (16.67/512) |
| Spectral Efficiency | 80% | 80% | 80% | 80% | 80% | 80% |

FIG. 3

| Transmission BW | 1.25 MHz | 2.5 MHz | 5 MHz | 10 MHz | 15 MHz | 20 MHz |
|---|---|---|---|---|---|---|
| Sub-frame Duration | 0.5 ms (500 μs) | | | | | |
| Sub-carrier Spacing | 20 kHz | | | | | |
| OFDM symbol time | 50.00 μs | | | | | |
| Sampling Frequency | 1.28 MHz (1/3x3.84 MHz) | 2.56 MHz (2/3x3.84 MHz) | 5.12 MHz (4/3x3.84 MHz) | 10.24 MHz (8/3x3.84 MHz) | 15.36 MHz (4x3.84 MHz) | 20.48 MHz (16/3x3.84 MHz) |
| Sampling Interval | 781.25 ns | 390.63 ns | 195.31 ns | 97.66 ns | 65.10 ns | 48.83 ns |
| FFT Size | 64 | 128 | 256 | 512 | 768 | 1024 |
| Number of Occupied Sub-carriers | 56 | 112 | 224 | 448 | 672 | 896 |
| Number of Guard Sub-carriers | 8 | 16 | 32 | 64 | 96 | 128 |
| Occupied RF BW | 1.12 MHz | 2.24 MHz | 4.50 MHz | 9.00 MHz | 13.50 MHz | 18.00 MHz |
| Oversampling Ratio | 1.14 x | 1.14 x | 1.14 x | 1.14 x | 1.14 x | 1.14 x |
| Power Efficiency | 87.5% | 87.5% | 87.9% | 87.9% | 87.9% | 87.9% |
| Number of OFDM Symbols per Frame (Short/Medium/Long CP) | 9/8/7 | | | | | |
| CP Length (μs/samples) Short | (5.47/7)x8 (6.25/8)x1 | (5.47/14)x8 (6.25/16)x1 | (5.47/28)x8 (6.25/32)x1 | (5.47/56)x8 (6.25/64)x1 | (5.47/84)x8 (6.25/96)x1 | (5.47/112)x8 (6.25/128)x1 |
| Spectral Efficiency | 90% | 90% | 90% | 90% | 90% | 90% |
| Medium | (12.5/16)x8 | (12.5/16)x8 | (12.5/16)x8 | (12.5/16)x8 | (12.5/16)x8 | (12.5/16)x8 |
| Spectral Efficiency | 80% | 80% | 80% | 80% | 80% | 80% |
| Long | (21.1/27)x6 (23.44/30)x1 | (21.1/54)x6 (23.44/60)x1 | (21.1/108)x6 (23.44/120)x1 | (21.1/216)x6 (23.44/240)x1 | (21.1/324)x6 (23.44/360)x1 | (21.1/432)x6 (23.44/480)x1 |
| Spectral Efficiency | 70% | 70% | 70% | 70% | 70% | 70% |

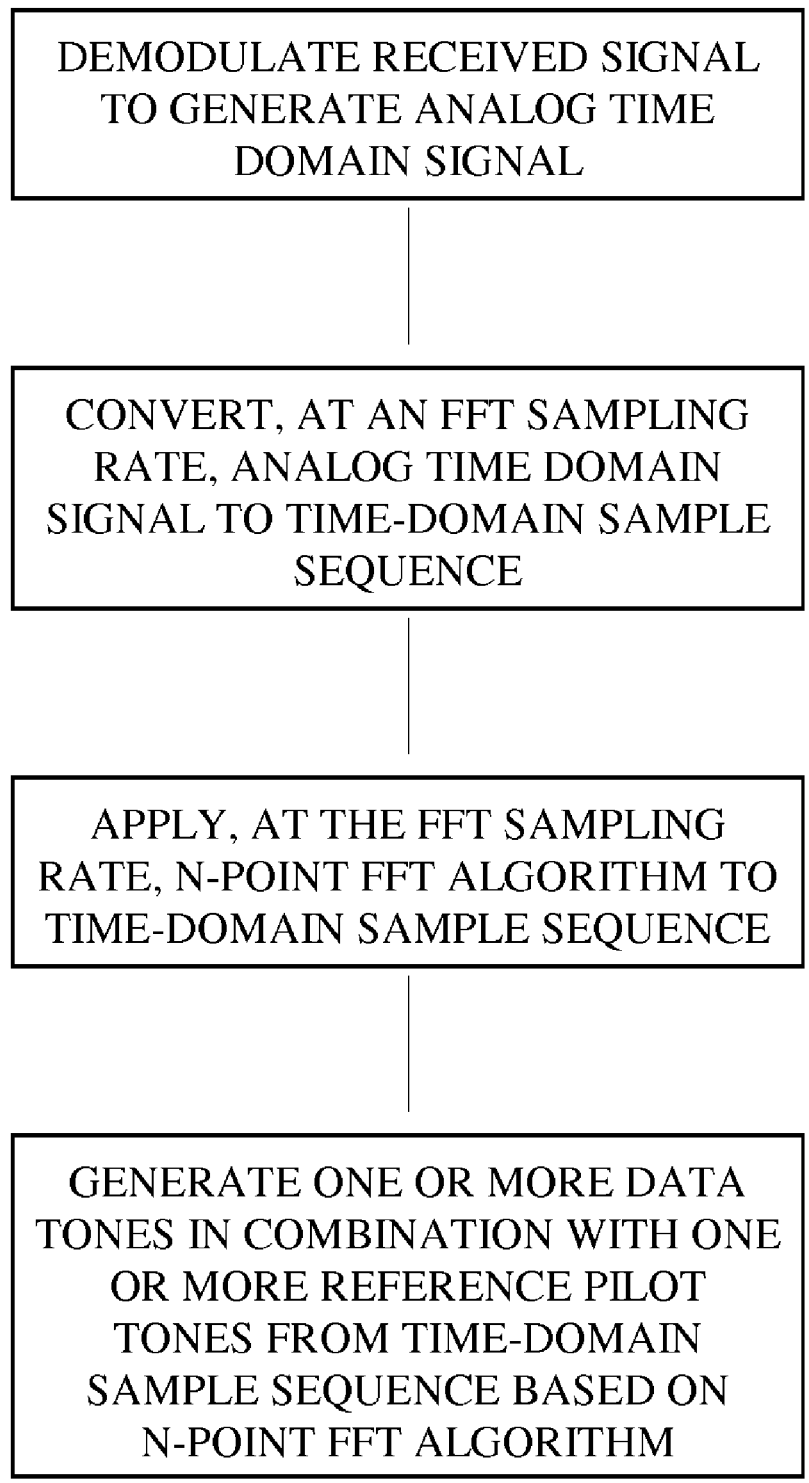

US 7,991,079 B2

FFT NUMEROLOGY FOR AN OFDM TRANSMISSION SYSTEM

CROSS-REFERENCE TO RELATED APPLICATIONS

This application is a divisional of U.S. patent application Ser. No. 11/838,989, filed Aug. 15, 2007, which itself claims the benefit of the filing date of U.S. provisional application No. 60/838,990, filed on Aug. 21, 2006, the teachings of both of which are incorporated herein by reference in their entirety.

BACKGROUND OF THE INVENTION

1. Field of the Invention

The present invention relates to wireless communication systems, and, in particular, to orthogonal frequency division multiple access (OFDMA) transmission.

2. Description of the Related Art

The 3rd Generation Partnership Project (3GPP) is a collaboration agreement established in December 1998 to bring together a number of telecommunications standards bodies, known as "Organizational Partners," that currently include ARIB, CCSA, ETSI, ATIS, TTA, and TTC. The establishment of 3GPP was formalized in December 1998 by the signing of the "The 3$^{rd}$ Generation Partnership Project Agreement".

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for maintenance and development of the Global System for Mobile communication (GSM) as Technical Specifications and Technical Reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA Network (UTRAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption. A study on the UTRA & UTRAN Long Term Evolution (UTRAN-LTE, also known as 3GPP-LTE and E-UTRA) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies.

3GPP-LTE is based on a radio-interface incorporating orthogonal frequency division multiplex (OFDM) techniques. OFDM is a digital multi-carrier modulation format that uses a large number of closely-spaced orthogonal subcarriers to carry respective user data channels. Each subcarrier is modulated with a conventional modulation scheme, such as quadrature amplitude modulation (QAM), at a (relatively) low symbol rate when compared to the radio frequency (RF) transmission rate. In practice, OFDM signals are generated using the fast Fourier transform (FFT) algorithm.

Consequently, in a 3GPP-LTE transmitter, user data is error encoded, mapped into a symbol constellation, reference pilot signals added, and a serial-to-parallel conversion applied to group the multiplexed symbols/reference pilots into sets of tones (in the frequency domain). An N-point inverse fast Fourier transform (IFFT) is applied to each set, where the integer size, N, of the N-point IFFT depends on the number of OFDM channels. The output of the IFFT is a set of complex time-domain samples. A parallel-to-serial conversion is applied to this time-domain sample stream before conversion from the digital domain to analog domain by a digital-to-analog converter (DAC). The DAC is clocked at the FFT sampling rate of the IFFT. The analog signal is then modulated and transmitted through the wireless medium.

One aspect of OFDM systems is that a number of low-rate streams are transmitted in parallel instead of a single high-rate stream, since low symbol rate modulation schemes (i.e., where the symbols are relatively long compared to the channel time characteristics) exhibit less inter-symbol interference (ISI) from multipath conditions. Since the duration of each symbol is long, a guard interval is inserted between the OFDM symbols to eliminate ISI. A cyclic prefix (CP) is transmitted during the guard interval, which consists of the end of the OFDM symbol copied into the guard interval. The OFDM symbol follows the guard interval. The guard interval includes of a copy of the end of the OFDM symbol so that the receiver can integrate over an integer number of sinusoid cycles for each of the multipath signals demodulating the OFDM signal with an FFT. Spectral efficiency (i.e., the ratio of useful OFDM symbol length to the total OFDM symbol length) increases with a shorter CP. Although the guard interval contains redundant data, reducing the capacity of some OFDM systems, a long guard interval allows transmitters to be spaced farther apart in a single-frequency network (SFN), and longer guard intervals allow larger SFN cell-sizes or better coverage in mountainous regions where signal delay spread is relatively large.

FIG. 1 shows a prior art table of values for a current numerology for the FFT specifications of an OFDM transmit data path architecture as proposed by 3GPP-LTE in 3GPP TR 25.814 v7.0.0 (2006-06). A 3GPP-LTE transmitter operates with one or more of six transmission bandwidths (BWs): 1.25 MHz, 2.5 MHz, 5 MHz, 10 MHz, 15 MHz, and 20 MHz. In each OFDM sub-frame, the sub-frame duration is 0.5 ms with 15 kHz sub-carrier spacing and a useful sub-frame period of 66.67 ms. 3GPP-LTE specifies a short CP and a long CP: if a short CP is used, a sub-frame comprises 7 OFDM symbols, while, if a long CP is used, a sub-frame comprises 6 OFDM symbols. As the transmission BW increases, the corresponding FFT size and FFT sampling frequency also increases.

In FIG. 1, the FFT sampling rates are oversampled by 1.7×, whereby the oversampling ratio is defined as the ratio of the FFT sampling rate to the occupied RF bandwidth. Oversampling of FIG. 1 provides frequency-domain filtering to reject adjacent channel interference (ACI) in the frequency domain, and obviates a requirement to reject ACI in the time domain (i.e., after the IFFT at the 3GPP-LTE transmitter and before the FFT at a 3GPP-LTE receiver). This high oversampling rate results from the constraint that the FFT sampling rate needs to be an integer multiple of 3.84 MHz (e.g., 2×, 4×, 6×, and 8×3.84 MHz). The constraint provides a simple rule for generating the various clock rates employed by the proposed 3GPP-LTE transmit data path architecture, but compromises power efficiency of a particular FFT implementation. The power efficiency is defined as the ratio of the occupied RF bandwidth to the FFT sampling rate In the current numerology, the power efficiency of the OFDM symbol is between 59.3% (best case) and 58.6% (worst case), which implies that between 40.7% and 41.4% of the power consumed by a processor performing the FFT (or IFFT) is wasted. Wasted processing power results in shorter battery life for a mobile handset (e.g., the user equipment (UE)).

SUMMARY OF THE INVENTION

In one embodiment, the present invention receives data in an orthogonal frequency division multiplex (OFDM) system operating in accordance with an FFT numerology and having one or more channels each having a corresponding transmission bandwidth. The data is processed at the transmitter by: a) applying, at an FFT sampling rate, an inverse of an N-point FFT algorithm to one or more data tones in combination with one or more reference pilot tones to generate a time-domain sample sequence; and b) converting, at the FFT sampling rate, the time-domain sample sequence to an analog time domain signal for modulation. The FFT numerology defines N as an integer representing a size of the N-point FFT algorithm determined by the FFT sampling rate, wherein a value for N is defined for each transmission bandwidth, and the FFT sampling rate is based upon a rational multiple of a base clock signal of the OFDM system so as to be less than 1.2× the corresponding transmission bandwidth.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 shows a prior art table of values for a current numerology for an FFT of a transmit data path architecture as proposed by 3GPP-LTE;

FIG. 3 shows a table of values for the FFT numerology in accordance with the exemplary embodiment of the present invention that may be employed by the transmitter of FIG. 2.

FIG. 4 represents a method of receiving data in an OFDM system operating in accordance with an FFT numerology and having one or more channels each having a corresponding transmission bandwidth.

DETAILED DESCRIPTION

Figure 2:
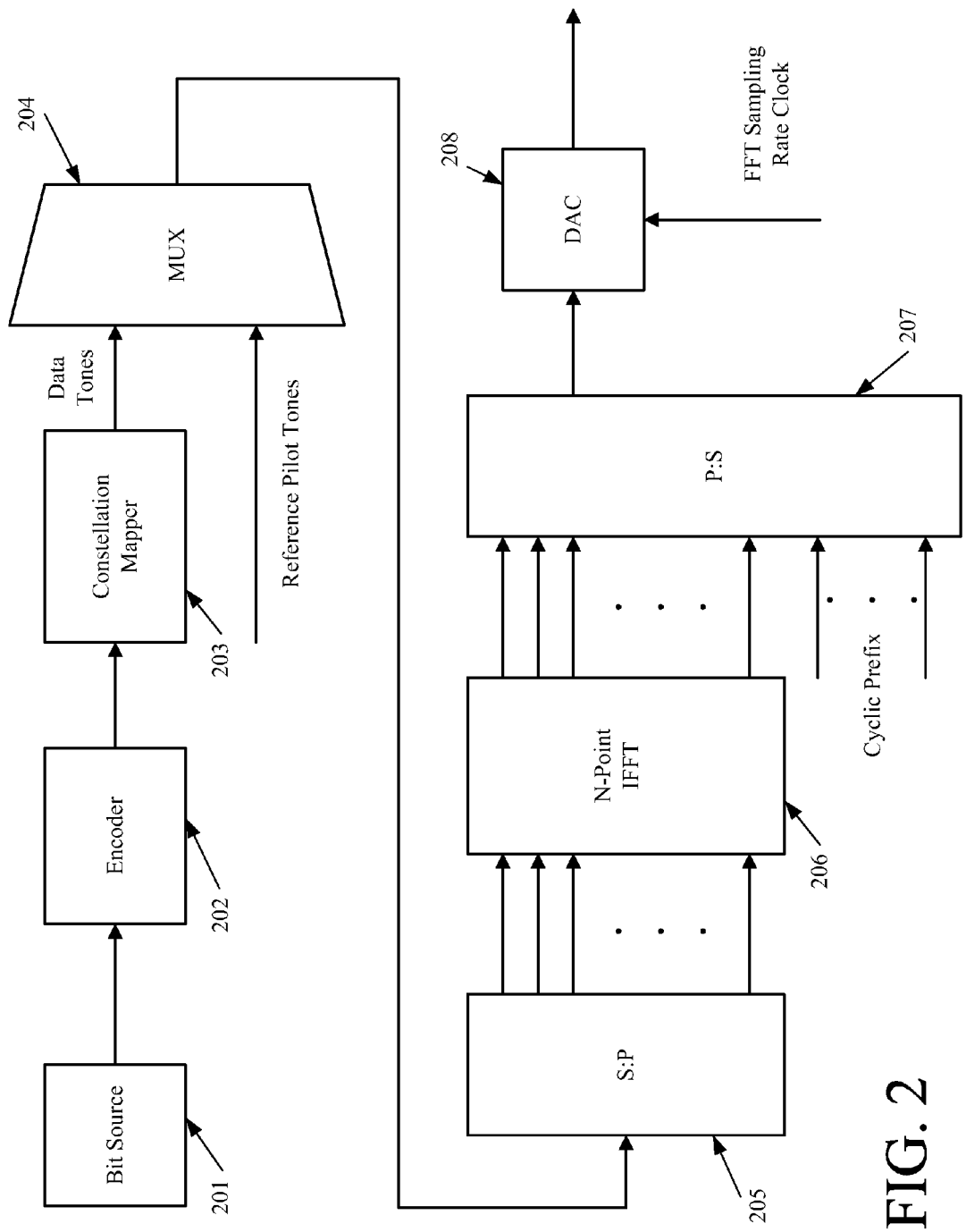
FIG. 2 shows a block diagram of a transmitter incorporating a Fast Fourier Transform (FFT) numerology in accordance with an exemplary embodiment of the present invention.

FIG. 2 shows a block diagram of transmitter 200 incorporating a Fast Fourier Transform (FFT) numerology in accordance with an exemplary embodiment of the present invention. Transmitter 200 might represent a transmit data path operating within an 3GPP-LTE standard-compliant system. Transmitter 200 includes bit source 201 representing user data that is encoded by encoder 202. Encoder 202 might be, for example, a convolutional encoder or a turbo-encoder that includes an interleaver and/or puncturer. Encoded data from encoder 202 is mapped into a symbol constellation by constellation mapper 203. Constellation mapper 202 might employ, for example, quadrature amplitude modulation (QAM) or phase-shift keyed (PSK) modulation to the encoded data.

The symbols from constellation mapper 203 represent data tones (i.e., sub-carriers) that are combined with one or more reference pilot tones by multiplexer (MUX) 204. The serial output stream of MUX 204 is converted to a parallel stream by serial-to-parallel converter (S:P) 205. The parallel stream from S:P 205 might include guard tones at the edges of an inverse fast Fourier transform (IFFT) that might be subsequently nulled. N-point IFFT block 206 applies an N-point IFFT to the parallel stream from S:P 205 to provide a set of N complex time-domain samples. Complex time-domain samples corresponding to a cyclic prefix are added to the set of complex time-domain samples from N-point IFFT block 206, and this combination is applied to parallel-to-serial converter (P:S) 207. P:S 207 provides a serial stream of complex values to digital-to-analog converter (DAC) 208. DAC 208 is clocked at the FFT sampling rate using an FFT sampling rate clock (at the FFT sampling frequency). The analog signal from DAC 208 is then modulated and transmitted through the wireless medium. The N-point FFT size (where "N" is the size value) and the FFT sampling frequency are related to the transmission bandwidth (BW) for a data channel, and are defined by an FFT numerology for transmitter 200.

As shown in FIG. 1, the prior art FFT numerology for the transmit data path architecture as proposed by 3GPP-LTE includes FFT sampling rates that are oversampled by 1.7×, resulting in poor power efficiency of the N-point FFT algorithm implementation (as used for the N-point IFFT in, e.g., block 206). This high oversampling rate results from the constraint that the FFT sampling rate needs to be an integer multiple of 3.84 MHz (e.g., 2×, 4×, 6×, and 8×). In accordance with exemplary embodiments of the present invention, an alternative FFT numerology reduces the FFT sampling rates to less than 1.2× (e.g., about 1.14×), thereby, for example, increasing the battery life of a UE. For the alternative FFT numerology of the present invention, constraints on the FFT sampling rate are relaxed so that the FFT sampling rate is a rational multiple of 3.84 MHz (in contrast to the integer multiple requirement of the prior art). The occupied RF bandwidth remains nearly unmodified from that of the prior art to maintain spectral mask requirements, while the FFT sampling rates are relatively closer to the occupied RF bandwidth, thereby reducing the oversampling ratio.

For prior art proposed 3GPP-LTE systems, the basic 3.84 MHz clock might be derived from a 19.2 MHz crystal using a divide-by-5 operation. In contrast, in accordance with the present invention, FFT sampling rates might be generated as follows. The basic 3.84 MHz clock is further divided by a factor of 3 after the divide-by-5 operation, followed by an integer multiplier (e.g., 2×, 4×, 8×, 12×, and 16× shown in FIG. 3). For a given implementation, extra complexity from the divide-by-3 operation is minimal.

FIG. 3 shows a table of values for an FFT numerology in accordance with the exemplary embodiment of the present invention. The FFT numerology of FIG. 3 is given for six transmission BWs: 1.25 MHz, 2.5 MHz, 5 MHz, 10 MHz, 15 MHz, and 20 MHz, where sub-frame duration is 0.5 ms with sub-carrier spacing at 20 kHz. FFT sizes for the six transmission BWs are 64, 128, 256, 512, 768, and 1024, respectively.

The exemplary, alternative FFT numerology of FIG. 3 changes the following parameters from that of the prior art of FIG. 1: intercarrier spacing increased to 20 kHz; FFT sampling frequency reduced across the transmission BWs; FFT size reduced by 2× across the transmission BWs; number of OFDM symbols per sub-frame increased; a medium length CP added; and long and short CP lengths modified. The alternative FFT numerology of FIG. 3 maintains sub-frame duration of the prior art of FIG. 1, while occupied RF bandwidth, while reduced slightly, is maintained nearly at the prior art occupied RF bandwidth values across all transmission BWs.

In FIG. 3, the choice of the intercarrier spacing is constrained by two factors: (a) the FFT size is selected as an integer power of 2 (i.e., N for the N-point FFT is $2^m$, where m is an integer), and (b) the intercarrier spacing is selected so that Doppler spread and phase noise exhibit a given design specification performance. Doppler spread might be selected to be around 1% of the intercarrier spacing. Mobility operation requirements might be on the order of 120 km/hr (i.e., the mobile unit or UE might be traveling at up to 120 km/hr without degraded performance). At 2 GHz, this operation corresponds to a Doppler spread of 220 Hz, yielding an intercarrier spacing of approximately 20 kHz. Consequently, in the 20 MHz transmission BW, the FFT sampling rate of 20.48 MHz allows for a 1024-point FFT with 20 kHz intercarrier spacing. Similar calculations might be employed to generate the FFT sampling rates for 1.25 MHz, 2.5 MHz, 5 MHz, 10 MHZ, and 15 MHZ transmission BWs shown in FIG. 3. Increasing the intercarrier spacing by 33% (from 15 kHz to 20 kHz), increases the separation between pilot tones by 33%. A given implementation might employ additional filter taps in a channel estimation interpolation filter, if employed, based on this increased separation between pilot tones.

In FIG. 3, the length of the long CP is extended for use in a mountainous terrain channel where delay spread might be about 20 µs, as compared to the long CP of 16.67 is of the prior art FIG. 1. A medium-length CP of constant length is added to allow for flexibility in maximizing spectral efficiency under various terrain conditions between the long CP and short CP lengths of FIG. 3. Spectral efficiency with the long CP is shown as approximately 70%, but in a given implementation the spectral efficiency might be improved by increasing the useful length of the OFDM symbol, with a corresponding reduction in intercarrier spacing.

Advantages provided by an FFT numerology in accordance with an exemplary embodiment of the present invention might include one or more of the following. Power efficiency of the OFDM symbol might be increased and power dissipation in an FFT processor reduced by employing reduced FFT sizes, yielding lower power requirements for a UE. The computational burden of an FFT implementation might be reduced while reducing the memory footprint of a given FFT implementation with the reduced FFT sizes. Robustness against Doppler spread, phase noise, and/or frequency offset might be increased. Extending the long mode of the cyclic prefix from 16.67 is to 21.43 is might aid with deployments in larger macro cells or cells with long delay spreads, such as might occur in systems with mountainous terrain. The added medium-length cyclic prefix (12.5 µs) offers flexibility when designing for maximized spectral efficiency under various terrain conditions.

FIG. 4 represents a method of receiving data in an OFDM system operating in accordance with an FFT numerology and having one or more channels each having a corresponding transmission bandwidth. The method comprises the steps of (a) demodulating a received signal to generate an analog time domain signal; (b) converting, at an FFT sampling rate, the analog time domain signal to a time-domain sample sequence; (c) applying, at the FFT sampling rate, an N-point FFT algorithm to the time-domain sample sequence; and (d) generating one or more data tones in combination with one or more reference pilot tones from the time-domain sample sequence based on the N-point FFT algorithm, wherein the FFT numerology defines (i) N as an integer representing a size of the N-point FFT algorithm determined by the FFT sampling rate, wherein a value for N is defined for each transmission bandwidth, and (ii) the FFT sampling rate based upon a rational multiple of a base clock signal of the OFDM system so as to be less than 1.2 times the corresponding transmission bandwidth.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

What is claimed is:

1. A method of receiving data in an orthogonal frequency division multiplex (OFDM) system operating in accordance with an FFT numerology and having one or more channels each having a corresponding transmission bandwidth, the method comprising the steps of:
   a) demodulating a received signal to generate an analog time domain signal;
   b) converting, at an FFT sampling rate, the analog time domain signal to a time-domain sample sequence;
   c) applying, at the FFT sampling rate, an N-point FFT algorithm to the time-domain sample sequence; and
   d) generating one or more data tones in combination with one or more reference pilot tones from the time-domain sample sequence based on the N-point FFT algorithm, wherein the FFT numerology defines:
      i) N as an integer representing a size of the N-point FFT algorithm determined by the FFT sampling rate, wherein a value for N is defined for each transmission bandwidth, and
      ii) the FFT sampling rate based upon a rational multiple of a base clock signal of the OFDM system so as to be less than 1.2 times the corresponding transmission bandwidth.

2. The invention of claim 1, wherein the one or more transmission bandwidths comprise 1.25 MHz, 2.5 MHz, 5 MHz, 10 MHz, 15 MHz, and 20 MHz.

3. The invention of claim 2, wherein the FFT sizes N corresponding to the one or more transmission bandwidths are 64, 128, 256, 512, 768, and 1024, respectively.

4. The invention of claim 2, wherein the FFT sampling rates corresponding to the one or more transmission bandwidths are 1.28 MHz, 2.56 MHz, 5.12 MHz, 10.24 MHz, 15.36 MHz, 15 MHz, and 20.48 MHz, respectively.

5. The invention of claim 2, wherein numbers of occupied sub-carriers of the OFDM system corresponding to the one or more transmission bandwidths are 56, 112, 224, 448, 672, and 896, respectively.

6. The invention of claim 1, wherein:
   the FFT numerology includes at least one cyclic prefix (CP); and
   the method generates at least one CP time-domain sample representing each CP into the time-domain signal.

7. The invention of claim 6, wherein the at least one CP comprises a short CP, a medium CP, and a long CP.

8. The invention of claim 7, wherein a number of OFDM symbols per frame for a short CP is 9, a number of OFDM symbols per frame for a medium CP is 8, and a number of OFDM symbols per frame for a long CP is 7.

9. The invention of claim 7, wherein, for the transmission bandwidth of 1.25 MHz, the short CP is at least one of ((5.47/7)×8)µs/samples and ((6.25/8)×1)µs/samples; the medium CP is ((12.5/16)×8)µs/samples, and the long CP is at least one of ((21.1/27)×6)µs/samples and ((23.44/30)×1)µs/samples.

10. The invention of claim 7, wherein, for the transmission bandwidth of 2.5 MHz, the short CP is at least one of ((5.47/14)×8)µs/samples and ((6.25/16)×1)µs/samples; the medium CP is ((12.5/16)×8)µs/samples, and the long CP is at least one of ((21.1/547)×6)µs/samples and ((23.44/60)×1)µs/samples.

11. The invention of claim 7, wherein, for the transmission bandwidth of 5 MHz, the short CP is at least one of ((5.47/28)×8)µs/samples and ((6.25/32)×1)µs/samples; the medium CP is ((12.5/16)×8)µs/samples, and the long CP is at least one of ((21.1/108)×6)µs/samples and ((23.44/120)×1)µs/samples.

12. The invention of claim 7, wherein, for the transmission bandwidth of 10 MHz, the short CP is at least one of ((5.47/56)×8)µs/samples and ((6.25/64)×1)µs/samples; the medium CP is ((12.5/16)×8)µs/samples, and the long CP is at least one of ((21.1/216)×6)µs/samples and ((23.44/240)×1)µs/samples.

13. The invention of claim 7, wherein, for the transmission bandwidth of 15 MHz, the short CP is at least one of ((5.47/84)×8)µs/samples and ((6.25/96)×1 )µs/samples; the medium CP is ((12.5/16)×8)µs/samples, and the long CP is at least one of ((21.1/324)×6)µs/samples and ((23.44/360)×1)µs/samples.

14. The invention of claim 7 wherein, for the transmission bandwidth of 20 MHz, the short CP is at least one of ((5.47/112)8)µs/samples and ((6.25/128)×1)µs/samples; the medium CP is ((12.5/16)×8)µs/samples, and the long CP is at least one of ((21.1/432)×6)µs/samples and ((23.44/480)×1) µs/samples.

15. The invention of claim 1, wherein the FFT numerology sets a sub-carrier spacing for the OFDM system as 20 kHz with a sub-frame duration of 0.5 ms.

16. The invention of claim 1, wherein the FFT numerology defines an oversampling ratio as a ratio of the FFT sampling rate to an occupied RF bandwidth for each transmission bandwidth and the oversampling ratio is about 1.14.

17. The invention of claim 1, wherein the method operates in accordance with a 3GPP-LTE standard.

* * * * *